United States Patent [19]
Holland et al.

[11] Patent Number: 5,745,690
[45] Date of Patent: Apr. 28, 1998

[54] DATA PROCESSING SYSTEM AND METHOD

[75] Inventors: Robert R. Holland; Stephen M. Fahey, both of Charlotte, N.C.

[73] Assignee: Electronic Data Systems Corporation, Plano, Tex.

[21] Appl. No.: 609,141

[22] Filed: Feb. 29, 1996

[51] Int. Cl.⁶ .................................................. G06F 11/34
[52] U.S. Cl. .......................... 395/200.41; 395/200.03; 711/112
[58] Field of Search ................ 395/200.03, 200.05, 395/200.13, 200.31, 200.41, 200.63; 364/DIG. 1; 711/112

[56] References Cited

U.S. PATENT DOCUMENTS

| | | | |
|---|---|---|---|
| 4,577,272 | 3/1986 | Ballew et al. | 364/200 |
| 5,027,269 | 6/1991 | Grant et al. | 364/200 |
| 5,287,453 | 2/1994 | Roberst | 395/200 |
| 5,550,979 | 8/1996 | Tanaka et al. | 395/200.05 |
| 5,606,693 | 2/1997 | Nilsen et al. | 395/610 |
| 5,640,544 | 6/1997 | Onodera et al. | 395/509 |

*Primary Examiner*—Larry D. Donaghue
*Attorney, Agent, or Firm*—L. Joy Griebenow

[57] ABSTRACT

A data processing system (10) is provided that comprises a number of TPF mainframe computers (12a) and (12b) which use a number of MVS mainframe computers (24a) and (24b) to access tape drive silos (34), (36) and (38). The TPF consoles (14), (16), (18) and (20) are coupled to MVS consoles (26), (28), (30) and (32) through a network bus (22). The TPF consoles and the MVS consoles function in a client server architecture to provide for the communication of tape mount and dismount requests from the TPF mainframes to the MVS mainframes and for confirmation of those activities from the MVS mainframes to the TPF mainframes.

10 Claims, 5 Drawing Sheets

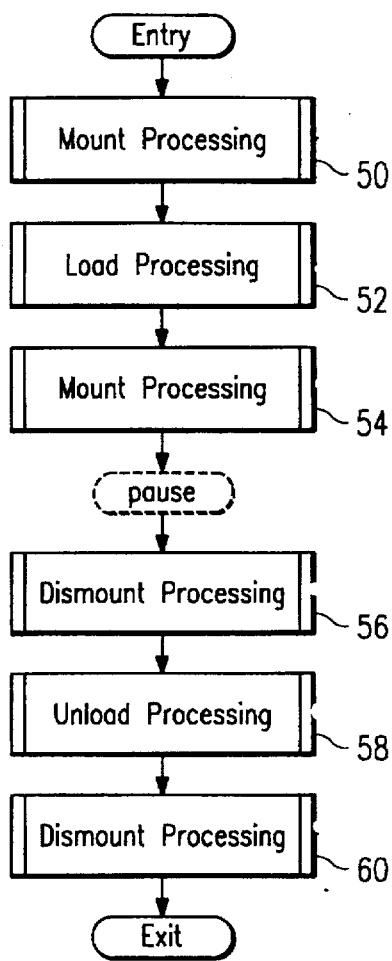
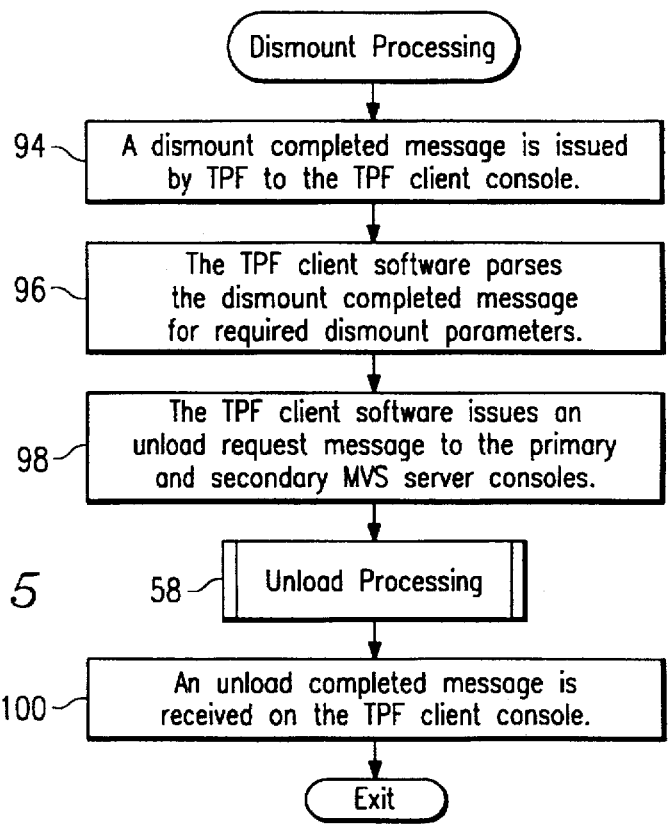
FIG. 2
FIG. 5

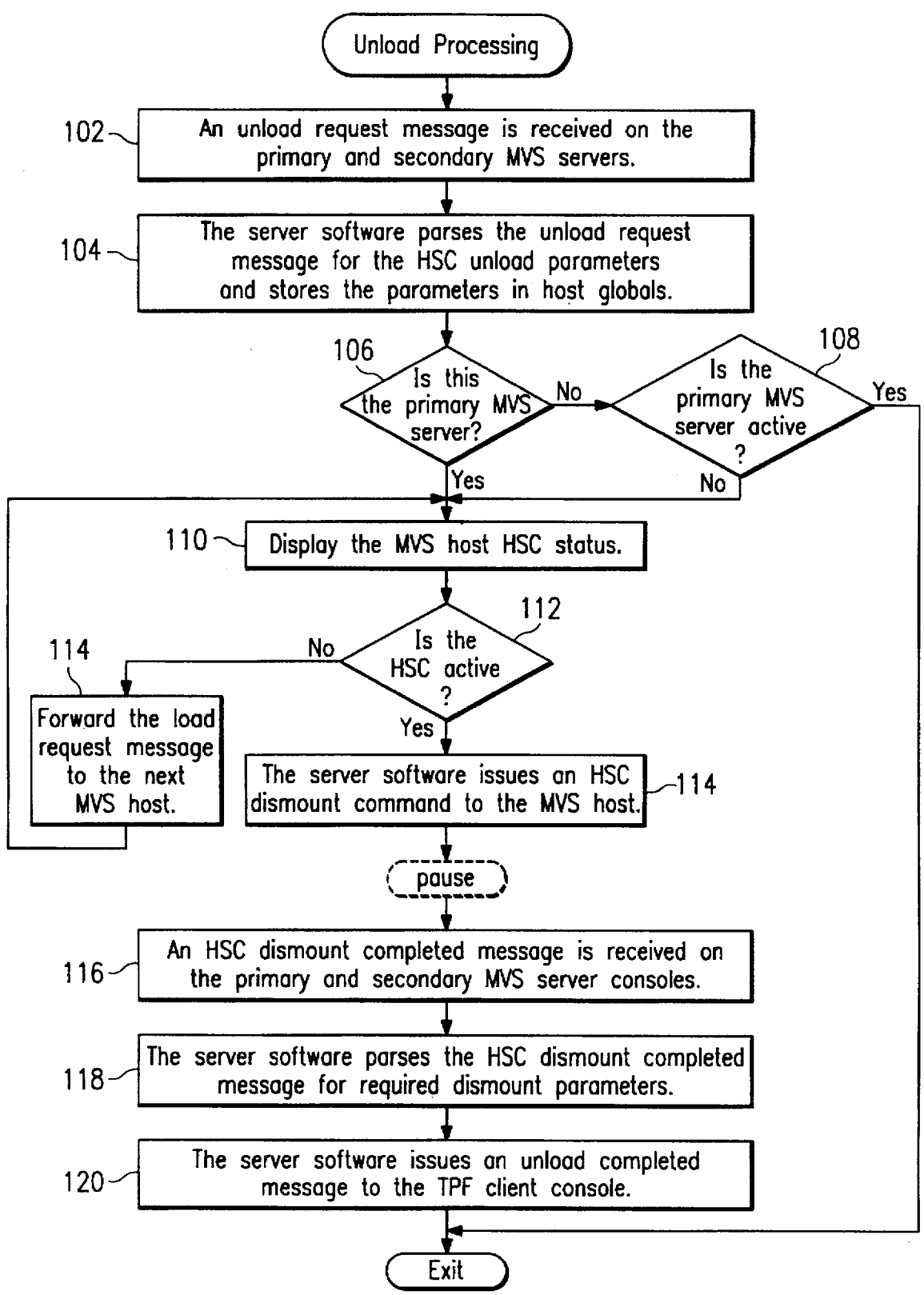

DATA PROCESSING SYSTEM AND METHOD

TECHNICAL FIELD OF THE INVENTION

This invention relates in general to the field of data processing systems and more particularly to an improved interface for disparate mainframe computers and method of operation.

BACKGROUND OF THE INVENTION

Two of the most common mainframe computers used for data processing use the Multiple Virtual Storage (MVS) and Transaction Processing Facility (TPF) operating systems. The MVS operating system allows for complex interaction with peripheral systems because of its feature-rich command set. The TPF operating system, on the other hand, uses a dramatically reduced instruction set. As a result, the TPF operating system runs significantly faster than the MVS operating system but is not capable of complex interaction with peripheral systems and does not perform error handling and correction under some circumstances. In order to allow for a TPF mainframe to interact with a peripheral system such as a tape drive, human operators were used to manually load and dismount the tapes.

The interaction between the TPF mainframe and the MVS mainframe was automated for some small scale systems by connecting the consoles of the TPF mainframe with the consoles of the MVS mainframe through a peer-to-peer conventional token ring connection. Initially, some of these systems had no multitasking capability and, as a result, only one tape could be used by the TPF system at a time. Multitasking was included in the peer-to-peer architecture through the storage of system and task information in network global variables. However, this architecture could not function with high capacity use because the consoles performing the interaction between the MVS mainframe and the TPF mainframe must each keep track of all network global information. In high capacity systems, the amount of information in the network global variables soon becomes so large that the process of updating a single console or bringing a console back into the loop after the console was down for some period of time requires much too long a period of time for effective operation.

As such, a need has arisen for a new architecture to provide efficient communication between mainframe computers of disparate types to allow for the access of automated tape drive handling equipment by a TPF mainframe computer.

SUMMARY OF THE INVENTION

In accordance with the teachings of the present invention, an interface system that allows for the interaction of disparate mainframe computer types is provided that substantially eliminates or reduces problems associated with prior architectures and methods of operation.

According to one embodiment of the present invention, a TPF mainframe communicates with a TPF console. The TPF console is connected to an MVS console through a token ring network. The MVS console is coupled to an MVS mainframe which controls a tape drive silo. The tape drive silo includes a tape handler and a plurality of tape drives. At least one of the tape drives is connected to and accessible by the TPF mainframe. The TPF console functions as a client to pass messages to the MVS console which functions as a communications server and mount and dismount request processor. All information regarding current tape drive operations and information necessary to handle tape drive mount and dismount requests is stored in the MVS console.

BRIEF DESCRIPTION OF THE DRAWINGS

A more complete understanding of the teachings of the present invention and the advantages thereof may be acquired by referring to the accompanying FIGUREs in which like reference numbers indicate like features and wherein:

FIGURE 2 is a flow diagram which illustrates a method of operating the data processing system shown in FIG. 1, according to the teachings of the present invention;

FIG. 5 is a flow diagram which illustrates in detail the dismount processing steps shown in FIG. 2; and FIG. 6 is a flow diagram which illustrates in detail the unload processing step shown in FIG. 2.

DETAILED DESCRIPTION OF THE INVENTION

Figure 1:
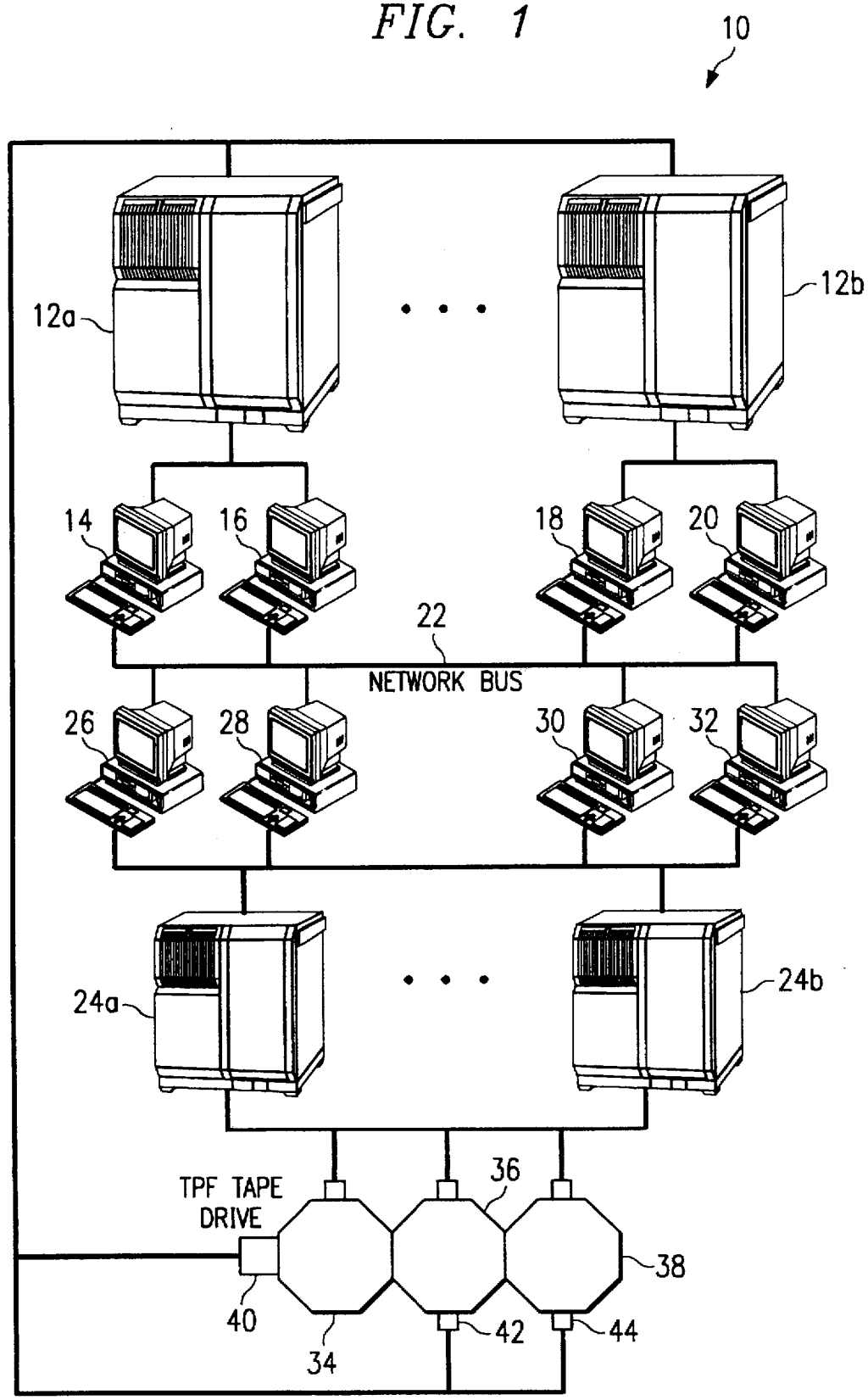
FIG. 1 is a schematic block diagram illustrating the architecture of a data processing system constructed according to the teachings of the present invention.

FIG. 1 is a schematic block diagram of a data processing system, indicated generally at 10, that comprises a number of TPF mainframe computers 12a and 12b. Although the present invention will be described with reference to two TPF computers, it should be understood that any number of TPF mainframe computers may use the system of the present invention due to the novel architecture of the interface systems described.

TPF mainframe computer 12a is preferably coupled to a TPF primary console 14 and a TPF backup console 16. Similarly, TPF mainframe computer 12b is preferably coupled to a primary TPF console 18 and a backup TPF console 20. Consoles 14, 16, 18 and 20 are coupled to a network bus 22 which may comprise, for example, a conventional IBM token ring network.

Data processing system 10 also comprises a plurality of MVS mainframe computers represented by computers 24a and 24b. It should be understood that a large number of MVS mainframe computers may utilize the system of the present invention. MVS mainframe computers 24a and 24b are each coupled to a primary MVS console 26. The mainframe computers 24a and 24b are also preferably coupled to backup MVS consoles 28, 30 and 32. The MVS consoles 26, 28, 30 and 32 are also coupled to the network bus 22 and use the network bus 22 to communicate with the TPF consoles 14, 16, 18 and 20.

The MVS mainframe computers 24a and 24b are also coupled to a number of tape handling systems represented by tape silos 34, 36 and 38. Tape silo 34 includes a TPF tape drive 40. Similarly, tape silo 36 includes a TPF tape drive 42 and tape silo 38 includes a TPF tape drive 44. The present invention may service any number of tape silos. Further, each tape silo may comprise a large number of tape drives. As will be discussed herein, the interface between the MVS mainframes 24a and 24b and the silos 34, 36 and 38 uses the conventional MVS commands to instruct the tape silos 34, 36 and 38 to retrieve the correct tape and actuate the correct tape drive. The TPF tape drives 40, 42 and 44 are coupled to the TPF mainframe computers 12a and 12b.

In general, the TPF mainframe computers 12a and 12b will utilize the MVS mainframes 24a and 24b to instruct the tape silos 34, 36 and 38 to load the correct tape in a correct tape drive for access by the TPF mainframes 12a and 12b. The communication between the TPF mainframe and the MVS mainframe is accomplished through the network connection of TPF consoles and MVS consoles discussed previously.

In general, the TPF consoles 14, 16, 18 and 20 act as a client in a client/server relationship with the primary MVS console 26. The TPF mainframe computer generates mount and dismount requests which are passed to the primary MVS console 26 by one of the TPF consoles 14, 16, 18 or 20. The processing of the request and the archiving of all active jobs being performed at any given time is performed by the primary MVS console 26 with backup from the MVS consoles 28, 30 and 32. Because of the critical role performed by the MVS console 26, it is preferable to have a large amount of redundancy embodied by the three backup consoles 28, 30 and 32. In addition, further redundancy is provided on the TPF side by each TPF mainframe preferably having both a primary console and a backup console. The client/server relationship between the TPF consoles and the MVS consoles provides for efficient multi-tasking of a large number of tape access jobs at any given time but provides for a minimum of network traffic so that the communications system as a whole operates very efficiently.

FIG. 2 is a flow diagram which illustrates the overall operation of the communications through network bus 22. The general processing begins at step 50 which is mount processing. The mount processing step 50 is performed by a TPF console such as TPF console 14. In general, the mount processing step 50 involves receiving a mount request from a TPF mainframe such as TPF mainframe 12a and insuring that the mount request is in the appropriate syntax before passing it to the network bus 22.

The method shown in FIG. 2 then proceeds to step 52, load processing, which is performed by the primary MVS console 26 or one of the backup MVS consoles 28, 30 or 32. In general, load processing step 52 comprises the steps performed by the MVS console 26 to receive the mount request and to instruct an MVS mainframe such as MVS mainframe 24a to mount the correct tape within one of the tape handling facilities. The method then proceeds to a second phase of the mount processing operation indicated at step 54 where a TPF console, such as TPF console 14, receives the acknowledgment from the MVS console and instructs a TPF mainframe, such as the TPF mainframe 12a, to use the tape which has been mounted.

In general, following step 54, the TPF mainframe 12a will use the tape for some period of time and then request a dismount of the tape after it is finished with the tape. This dismount request is processed in step 56 shown in FIG. 2 which is referred to as dismount processing. Dismount processing step 56 is very similar to mount processing step 50 in that it is performed by the TPF console 14 and comprises operations to insure that the dismount command is in proper syntax and is passed from the network bus 22 to the MVS console 26. The method then proceeds to step 58, referred to as unload processing, where the MVS console 26 instructs the MVS mainframe 24a to unload the tape. Finally, the method proceeds to a second phase of dismount processing indicated at step 60 where an acknowledgment message is returned to the TPF console 14 to inform an operator of the TPF console that the tape has been unloaded. The method then terminates.

Figure 3:
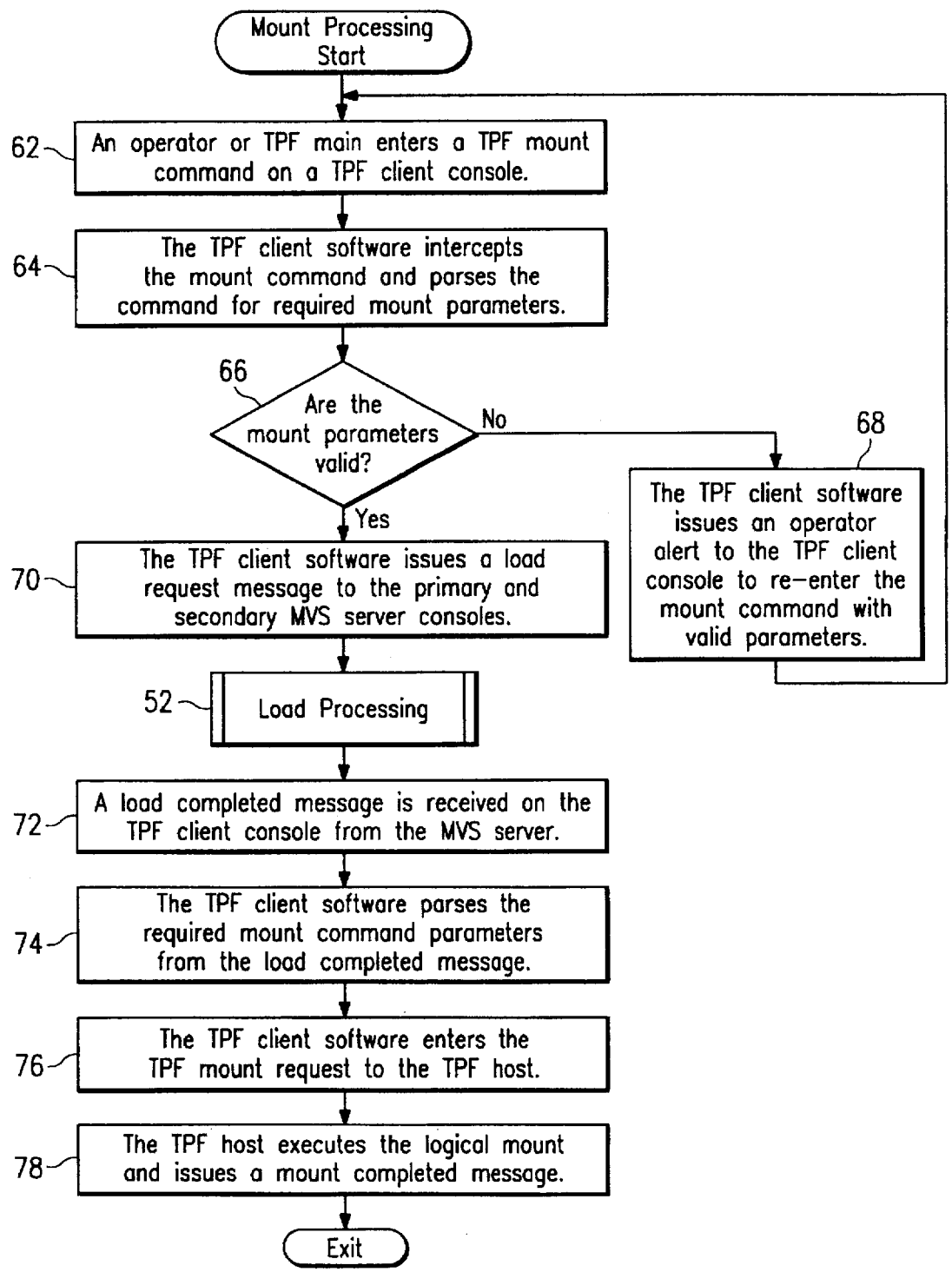
FIG. 3 is a flow diagram which illustrates in detail the mount processing steps shown in FIG. 2, according to the teachings of the present invention.

FIG. 3 is a flow diagram which shows in detail the steps performed in the mount processing steps 50, 52, and 54 described previously with reference to FIG. 2. The mount processing operation begins at step 62 where an operator occupying one of the TPF consoles 14, 16, 18 or 20 enters a TPF mount command on one of the TPF client consoles. In the alternative, an application program running on one of the TPF mainframes 12a or 12b can automatically issue a TPF mount command through one of the TPF consoles 14, 16, 18 or 20. The method then proceeds to step 64 where the interface software running on the TPF console 14 intercepts the mount command and parses the command for the required mount parameters. The method then proceeds to step 66 where a determination is made if the mount parameters in the mount command are valid. If the parameters are not valid, the method proceeds to step 68 where the TPF client software issues an operator alert through the TPF console to reenter the mount command with valid parameters. The method returns from step 68 to the beginning of operations to wait for a new mount command or the reentry of the invalid mount command.

If the mount parameters were valid at step 66, the method proceeds to step 70 where the TPF interface software issues a load request message to the primary and secondary MVS server consoles 26, 28, 30 and 32. This load request message is routed through the network bus 22. Each of the MVS consoles 26, 28, 30 and 32 receive the message in order to provide for complete redundancy in the operation of the interface system. The method then proceeds to the load processing step 52 which will be described more completely with reference to FIG. 4. Referring to FIG. 3, processing continues after the load processing is completed at step 72 when a load completed message is received on the TPF client console such as console 14 from the MVS server console such as MVS console 26.

The method then proceeds to step 74 where the TPF client software running on TPF console 14, for example, parses the required mount command parameters from the load completed message received in step 72. The method then proceeds to step 76 where the TPF client software enters the TPF mount request to the TPF host mainframe such as TPF mainframe 12a. Finally, the method proceeds to step 78 where the TPF mainframe 12a executes the logical mount of the tape and issues a mount completed message which is returned to the TPF console 14. The mount processing operation then terminates.

Figure 4:
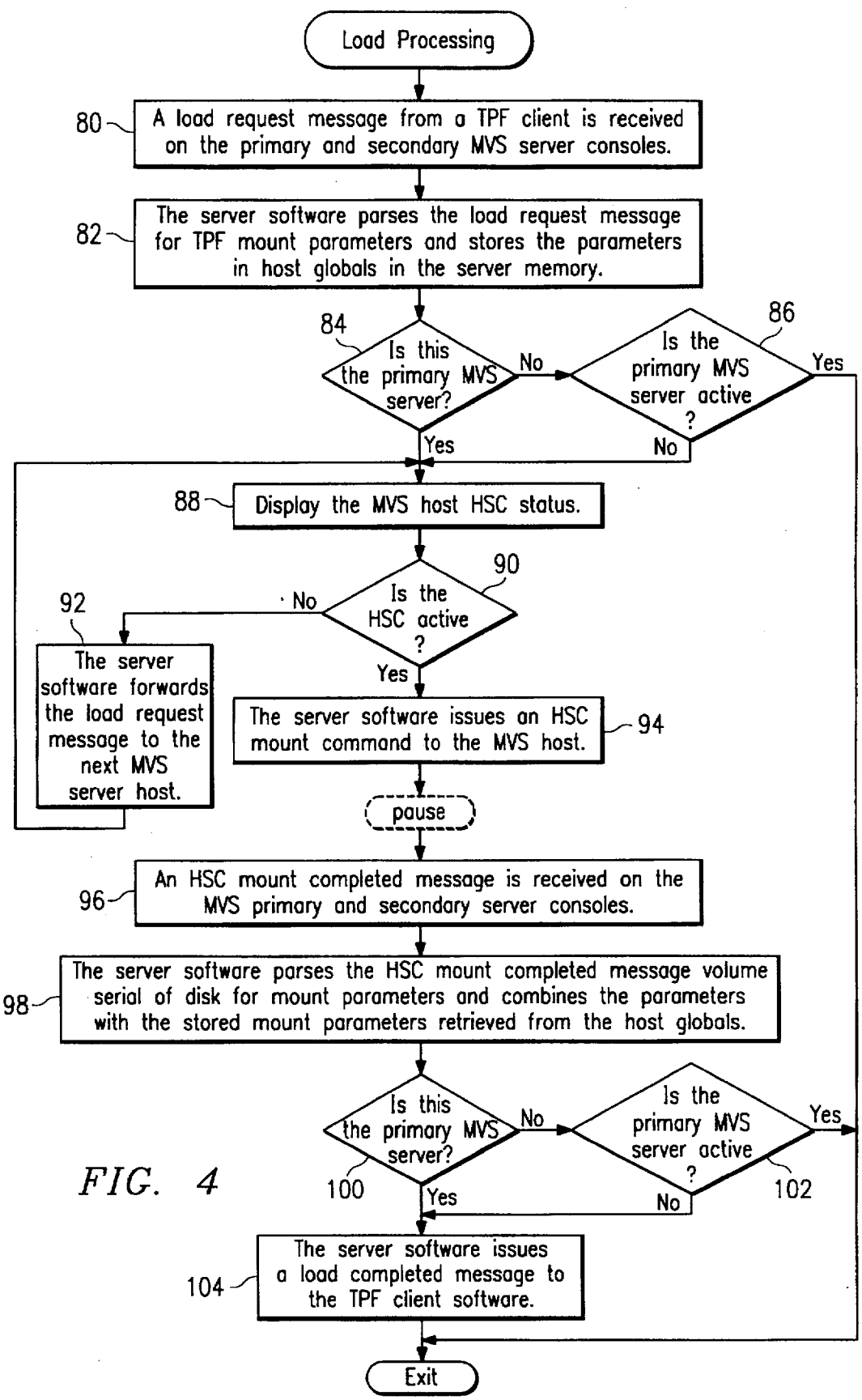
FIG. 4 is a flow diagram which illustrates in detail the load processing step shown in FIGS. 2 and 3.

FIG. 4 illustrate the detailed operation of the load processing step 52 described with reference to FIG. 2 and 3. The load processing operation begins at step 80 where a load request message from one of the TPF client consoles 14, 16, 18 or 20 is received on the primary and all of the secondary MVS server consoles 26, 28, 30 and 32. The method then proceeds to step 82 where software running on the server consoles 26, 28, 30 and 32 then parses the load request message to the required TPF mount parameters and stores the parameters in host global variables within each of the MVS consoles 26, 28, 30 and 32. Processing then proceeds to a step 84 where each of the MVS consoles 26, 28, 30 and 32 running the server software determine whether or not they are the primary MVS server at that time. If they are not the primary server at that time, the method proceeds to step 86 where each of the consoles determines if the primary MVS server is active. If the primary MVS server is active, the processing on that particular backup MVS console ends. If the primary MVS server is not active at step 86 or if the particular console running the console is now the primary MVS server at step 84 by virtue of the primary MVS server being inoperative, the method proceeds to step 88 where the particular MVS console displays the MVS host Host System Component (HSC) status. The HSC software is the software running in the MVS mainframe computers 24a and 24b which operates and controls the tape silos 34, 36 and 38. In step 88, the MVS console requests the status information from the MVS mainframes 24a and 24b with respect to the particular HSC control application. The method then proceeds to step 90 where the primary MVS console 26 determines if the status of the HSC software is active. If the HSC software is not active, the method proceeds to step 92 where the server software within the MVS console 26 forwards the load request methods to the next MVS server host. The method then returns to step 88 where the next server is queried regarding the status of the HSC software. In this manner, if, for example, the MVS mainframe 24a is not active, the MVS console 26 will query the next MVS mainframe until it finds one with the HSC software active.

If the HSC software was active at step 90, the method proceeds to step 94 shown on FIG. 4 where the server software within the MVS console 26 issues an HSC mount command to the MVS mainframe 24a or whichever MVS mainframe had the active HSC software.

The MVS mainframe 24a will then use conventional communication to instruct one of the silos 34, 36 or 38 to load an appropriate tape in an appropriate tape drive. Once the mounting operation is completed, the MVS mainframe computer 24a will return a mount completed message to the primary MVS console 26 and the secondary MVS consoles 28, 30 and 32 at step 96.

The method then proceeds to step 98 where a server software within the MVS console 26 parses the HSC mount completed message to retrieve the mount parameters and combines these parameters with the stored mount parameters. The stored mount parameters are retrieved from the storage within the MVS console 26. These parameters were stored as global variables which are also stored in the backup consoles 28, 30 and 32. The additional information received from the MVS mainframe 24a includes the volume and serial number of the disk loaded by the tape silo at the direction of the MVS mainframe 24a. Each of the MVS consoles 26, 28, 30 and 32 perform step 96 and step 98 so that if something has happened to the primary MVS console 26 during the operations performed by the MVS mainframe, any of the MVS consoles can continue the interaction with the TPF consoles.

The method then proceeds to step 100 where each of the MVS consoles determines whether they are the primary MVS server. If the particular MVS console is not the primary MVS server, the method proceeds to step 102 where the non-primary MVS consoles determine if the primary MVS server is active. If the MVS server is active, the MVS consoles do not need to take further action and the method terminates. If the primary MVS server is not active at step 102 or if the console determined that it was the primary MVS server at step 100, the method proceeds at step 104 where the MVS server software issues a load completed message to the TPF client's software running in the TPF console 14. As discussed previously, the method then proceeds to step 72 discussed with reference to FIG. 3b.

FIG. 5 illustrates in greater detail the dismount processing discussed with reference to steps 56 and 60 in FIG. 2 previously. The dismount process begins at step 94 where a dismount completed message is issued by the TPF mainframe 12a to the TPF console 14. The method then proceeds to step 96 where the TPF client software within the TPF console 14 parses the dismount completed message for the required dismount parameters. The message then proceeds to step 98 where the TPF client software issues an unload request message to the primary and all the secondary MVS server consoles 26, 28, 30 and 32. The method then proceeds to the unload processing step 58 which will be described more completely with reference to FIG. 6. After the unload processing step 58 is completed, the method finishes in step 100 where an unloaded completed message is received on the TPF client console 14. The method then terminates.

FIG. 6 illustrate the detailed steps of the unload processing step 58 described with reference to FIG. 2 previously. The unload processing operation begins at step 102 where an unload request message is received on the primary MVS server 26 and on each of the secondary MVS servers 28, 30 and 32. The server software on each of the MVS consoles then parses the unload request message in step 104 to locate the HSC unload parameters and store those parameters in host globals within the storage systems of each of the MVS consoles 26, 28, 30 and 32. The method then proceeds to step 106 where each of the MVS consoles determines if it is the primary MVS server. If any of the consoles determines that it is not the primary MVS server, the method proceeds for that console to step 108 where the console determines if the primary MVS server is active. If the primary MVS server is active at that time, the method terminates.

If the primary MVS server is not active at that time in step 108 or if a console determined that it was the primary MVS server at step 106, the method proceeds to step 110 where the particular MVS console requests the MVS mainframe 24a or 24b to display the status of the HSC tape handling software. The method then proceeds to step 112 where the console determines if the HSC software is active. If the HSC software is not active within the MVS mainframe 24a or 24b, the method proceeds to step 114 where a load request message is forwarded to the next MVS mainframe. The method then returns to step 110 where the next mainframe is asked for the status of the HSC software.

If the HSC software was active in step 112, the method proceeds to step 114 which is shown in FIG. 6. At step 114, the server software within the particular MVS console issues an HSC dismount command to the appropriate MVS mainframe 24a or 24b. The MVS consoles then continue to do other processing until, in step 116, an HSC dismount completed message is received from the appropriate MVS mainframe on all of the MVS consoles including the primary MVS console 26 and each of the backup MVS consoles 28, 30 and 32. The method then proceeds to step 118 where the server software within the MVS console 26 parses the HSC dismount completed message for the required dismount parameters. The method then finally proceeds to step 120 where the server software issues an unloaded completed message to the TPF client software within the TPF console 14. The method then terminates.

Accordingly, a system is provided that allows for the communication between a TPF mainframe and an MVS mainframe in order to provide access to tape silos for the TPF mainframe which does not have the native capability to direct a tape silo machine. The interface system uses a client server architecture with the TPF consoles functioning with client software and the MVS consoles functioning in a server role. Four-deep redundancy is preferably provided at the server level to insure the availability of the MVS mainframes with their tape handling capability. The required parameters for each job and all activities performed by the client consoles are stored in the primary as well as all the backup server consoles so that if a primary server is taken offline at any time during the process, the backup servers can complete the process and continue on with the operation of the system.

Although the present invention has been described in detail, it should be understood that various changes, alterations and substitutions may be made to the teachings incorporated herein without departing from the spirit and scope of the present invention which is solely defined by the appended claims.

What is claimed is:

1. A data processing system comprising:

a Transaction Processing Facility (TPF) mainframe computer coupled to a TPF console and at least one TPF tape drive serviced by a tape handling system;

a Multiple Virtual Storage (MVS) mainframe computer coupled to an MVS console, the MVS mainframe computer coupled to and operable to control the tape handling system; and the MVS console and the TPF console coupled to and operable to communicate through a network bus, the MVS console operable to execute server software which is operable to receive requests for tape handling operations from client software running in the TPF console.

2. The data processing system of claim 1 and further comprising:

a backup TPF console coupled to the TPF mainframe computer and to the network bus; and a backup MVS console coupled to the network bus and the MVS mainframe computer, the backup MVS console operable to also receive all requests for tape handling operations and to store such information such that the backup MVS console can operate as the primary MVS console in the event that the primary MVS console becomes inoperative.

3. The data processing system of claim 1 and further comprising:

a second TPF mainframe computer coupled to a second TPF console, the second TPF console also coupled to and operable to communicate through the network bus; and a second MVS mainframe computer coupled to the MVS console, the MVS console operable to receive tape handling requests and to issue tape handling commands to both the first and second MVS mainframe computers, the second MVS mainframe computer coupled to a second tape handling system servicing at least one additional tape drive coupled to at least one of the TPF mainframe computers.

4. The data processing system of claim 1 wherein the network bus comprises a token ring network communications system.

5. The data processing system of claim 1 wherein the tape handling system comprises a tape handling silo.

6. A data processing system comprising:

a TPF mainframe computer coupled to a TPF console and at least one TPF tape drive serviced by a tape silo;

an MVS mainframe computer coupled to an MVS console, the MVS mainframe computer coupled to and operable to control the tape silo;

the MVS console and the TPF console coupled to and operable to communicate through a network bus;

the MVS console operable to execute server software operable to receive requests for tape handling operations from client software running in the TPF console;

a backup TPF console coupled to the TPF mainframe computer and to the network bus;

a backup MVS console coupled to the network bus and the MVS mainframe computer, the backup MVS console operable to also receive all requests for tape handling operations and to store such information such that the backup MVS console can operate as the primary MVS console in the event that the primary MVS console becomes inoperative;

a second TPF mainframe computer coupled to a second TPF console, the second TPF console also coupled to and operable to communicate through the network bus; and a second MVS mainframe computer coupled to the MVS console, the MVS console operable to receive tape handling requests and to issue tape handling commands to both the first and second MVS mainframe computers, the second MVS mainframe computer coupled to a second tape silo servicing at least one additional tape drive coupled to at least one of the TPF mainframe computers.

7. The data processing system of claim 6 wherein the network bus comprises a token ring network communications system.

8. A method of processing data comprising the steps of:

initiating a tape handling command within a TPF console connected to a TPF mainframe computer;

transmitting the tape handling command from a client program running in the TPF console to a server program running in the TPF console to a server program running in an MVS console connected to the TPF console through a network bus;

processing the tape handling command in the server program within the MVS console such that parameters associated with the tape handling command are stored within the memory systems associated with the MVS consoles;

transmitting instructions associated with the tape handling command to an MVS mainframe computer connected to the MVS console;

controlling a tape handling apparatus connected to the MVS mainframe computer responsive to the instructions received from the MVS console; and accessing a tape drive associated with the tape handling apparatus from the TPF mainframe computer.

9. The method of claim 8 and further comprising the steps of:

transmitting the tape handling command from the TPF console to at least one backup MVS console; and storing parameters associated with the tape handling command in the memory systems associated with the backup MVS console such that the backup MVS console can continue operation in the event that the MVS console goes offline.

10. The method of claim 8 and further comprising the step of transmitting information indicating that an appropriate tape has been loaded and is ready to be accessed by the TPF mainframe computer from the MVS server software to the TPF client software through the network bus.

* * * * *